(12) United States Patent
Yoo

(10) Patent No.: US 7,880,628 B2
(45) Date of Patent: Feb. 1, 2011

(54) BATTERY CASE AND SECONDARY BATTERY USING THE SAME

(75) Inventor: Daehyung Yoo, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 306 days.

(21) Appl. No.: 12/232,602

(22) Filed: Sep. 19, 2008

(65) Prior Publication Data

US 2009/0027218 A1    Jan. 29, 2009

(30) Foreign Application Priority Data

Sep. 21, 2007    (KR) .................. 10-2007-0096391

(51) Int. Cl.
*G08B 21/00*    (2006.01)
(52) U.S. Cl. .................. 340/636.1; 340/636.16; 429/149; 429/151; 429/163; 320/107; 320/112
(58) Field of Classification Search ............ 340/636.1, 340/636.16, 636.11, 636.12, 636.13, 636.14, 340/636.19, 636.2, 636.21; 429/179, 163, 429/99, 149, 150, 151, 153; 320/134, 162, 320/164, 107, 112
See application file for complete search history.

(56) References Cited

U.S. PATENT DOCUMENTS

| | | | |
|---|---|---|---|
| 5,406,266 A | * | 4/1995 | Mino et al. ............ 340/636.19 |
| 5,517,277 A | * | 5/1996 | Goto et al. .................. 396/281 |
| 6,078,164 A | * | 6/2000 | Park .......................... 320/107 |
| 6,811,902 B2 | * | 11/2004 | Benson et al. ................. 429/7 |
| 7,638,234 B2 | * | 12/2009 | Naito et al. ................. 429/100 |

FOREIGN PATENT DOCUMENTS

| | | |
|---|---|---|
| JP | 04-022074 | 1/1992 |
| JP | 05-101852 A | 4/1993 |
| JP | 10-188735 | 1/1998 |
| JP | 2005-044645 A | 2/2005 |

* cited by examiner

*Primary Examiner*—Toan N Pham
(74) *Attorney, Agent, or Firm*—Robert E. Bushnell, Esq.

(57) ABSTRACT

A battery case and a secondary battery incorporating the battery case, comprised of the battery case being provided with a push button of pressure distribution structure in order to prevent a push button mount from being damaged due to the pressure against the push button for checking residual capacity. The secondary battery according to the present invention comprises a bare cell, a circuit which is electrically connected with the bare cell, and calculates the residual capacity of the bare cell, and has a push switch and a light emitting device, a case which receives the bare cell and the circuit and comprises a residual capacity display unit having a fulcrum and a display window respectively at positions corresponding to the push switch and the light emitting device, and a cover film which is attached to an external surface of the residual capacity display unit.

16 Claims, 6 Drawing Sheets

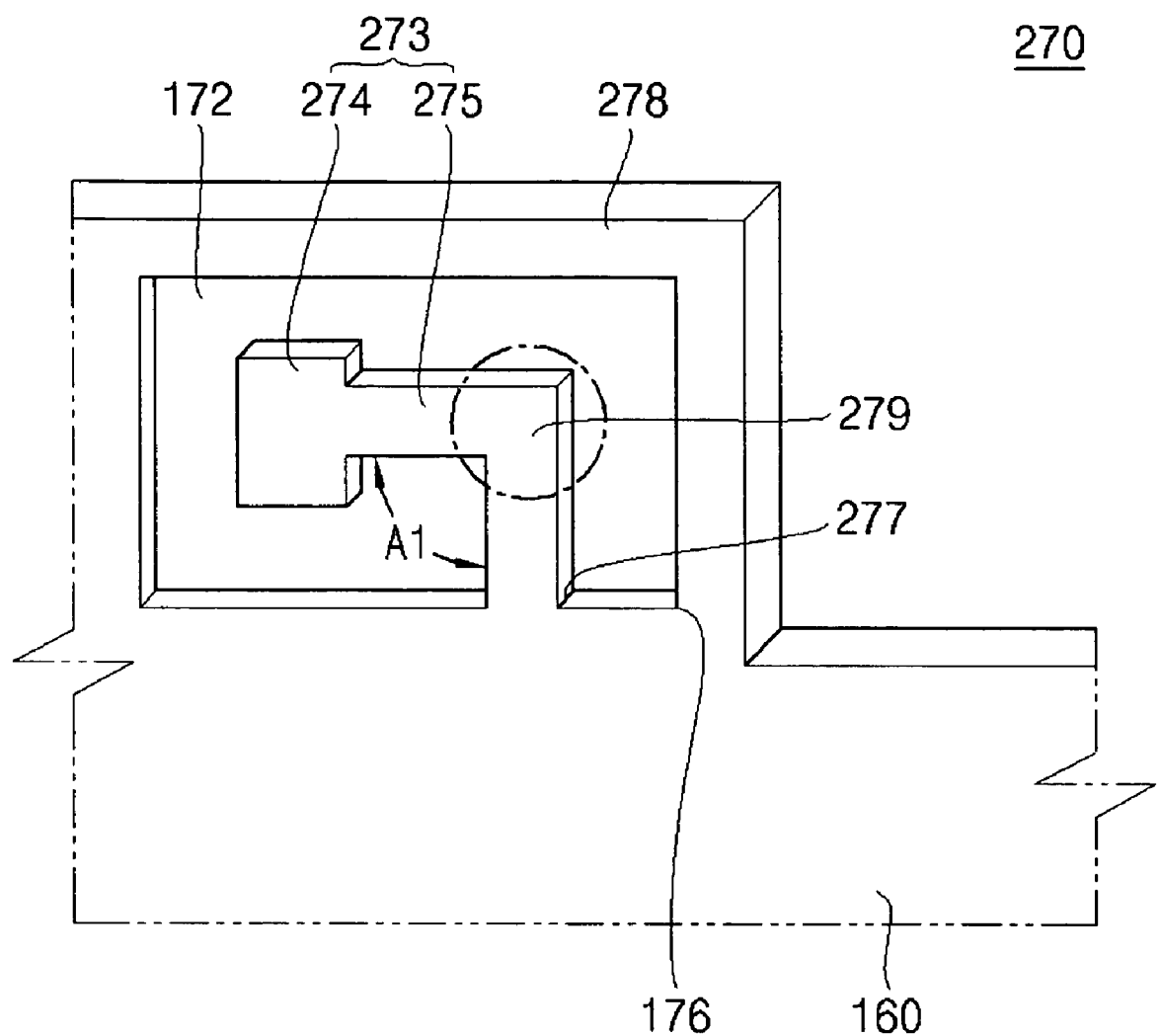

BATTERY CASE AND SECONDARY BATTERY USING THE SAME

CLAIM OF PRIORITY

This application makes reference to, incorporates the same herein, and claims all benefits accruing under 35 U.S.C. §119 from an application for BATTERY CASE AND SECONDARY BATTERY USING THE SAME earlier filed in the Korean Intellectual Property Office on 21 Sep. 2007 and there duly assigned Ser. No. 10-2007-0096391.

BACKGROUND OF THE INVENTION

1. Field of the Invention

The present invention relates to a secondary battery and a case of the secondary battery, and more particularly, to a battery case and a secondary battery using the battery case, wherein the battery case is provided with a push button for checking residual capacity which distributes pressure in order to prevent a push button mount from being damaged due to the pressure against the push button.

2. Description of the Related Art

Generally, mobile electronics such as notebook computers, personal digital assistants (PDAs), mobile phones or digital cameras are powered by a secondary battery pack. The residual capacity of the battery is typically displayed on a picture plane of the electronics because usable time of this battery pack is limited. The residual capacity is largely displayed in the form of bar having a specific length, and the length of the bar is directly proportional to the residual capacity of the battery pack. Therefore, users estimate the current residual capacity of the battery pack by looking at the length of the bar displayed on the picture plane of the electronics.

This battery pack has a disadvantage; however, because the user can check the residual capacity only when the battery pack is installed inside the electronics. That is, there is a problem that it is not possible to check the residual capacity of the battery pack in a state when the battery pack is detached from the electronics or when the electronics are turned off.

SUMMARY OF THE INVENTION

Therefore, an aspect of the present invention to provide an improved secondary battery and an improved battery case of a secondary battery. It is another aspect to provide a secondary battery having a battery residual capacity display unit capable of checking the residual capacity of the battery pack, even when the electronics are turned off or when the battery pack is detached from the electronics.

Another aspect of the present invention is to provide a battery case, which is equipped with a push button for checking residual capacity of the battery pack whenever the user wants, and a secondary battery having the battery case.

And, another aspect of the present invention is to provide a battery case, which is provided with a push button which distributes pressure in order to prevent a mount for the push button from being damaged due to the application of pressure against the push button, and a secondary battery having the battery case.

To achieve the these and other aspects, a secondary battery constructed according to the principles of the present invention contemplate a bare cell; a circuit which is electrically connected with the bare cell, that calculates the residual capacity of the bare cell, and that has a push switch and a light emitting device; a case which removably receives the bare cell and the circuit and which includes a residual capacity display unit having a fulcrum and a display window, respectively, at positions corresponding to the push switch and the light emitting device; and a cover film which is attached to an external surface of the residual capacity display unit.

The display window may be made of a through-hole to emit the light from the light emitting device to the exterior of the case.

A button hole may be formed in the residual capacity display unit at a position corresponding to the fulcrum. The fulcrum is formed as a portion of the case and is extended from the case to the button-hole.

The fulcrum may be constructed from a leg which is extended from the case, and a head which is united with the leg to have the width that is wider than the width of the leg.

The fulcrum may be formed as the leg and be bent to be parallel to the surface of the case on which the residual capacity display unit is formed.

The fulcrum may be formed as the leg and be bent to an orientation that is perpendicular to the surface of the case on which the residual capacity display unit is formed.

A protrusion may be formed on one surface of the head.

The light emitting device may be a light emitting diode.

The cover film may include a display pattern that corresponds to the display window and projects the light from the light emitting diode, and a button cap which is formed at a position corresponding to the fulcrum and which contacts the fulcrum in response to the external pressure.

These aspects, as well as other features and effects of the present invention, will be more apparent from the detailed description of preferred embodiments taken in conjunction with the accompanying drawings.

The following detailed description in relation to the accompanying drawings is described to explain the details of the construction and use of several possible embodiments of the present invention, but is not intended to limit the present invention in any form. It is to be appreciated that the same functions, or equivalent functions within the spirit or scope of the present invention, may be achieved by other embodiments.

The features described in the drawings are magnified for explanation purposes, and the drawings and constitutional elements thereof are not always illustrated in proper scale. A skilled man in the art, however, will be able to appreciate these matters with ease.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIG. 3 is an exemplary view illustrating a fulcrum constructed as another exemplary embodiment of the principle of the present invention.

DETAILED DESCRIPTION OF THE INVENTION

Hereinafter, exemplary embodiments of the principle of the present invention will be described with reference to accompanying drawings.

Figure 1:
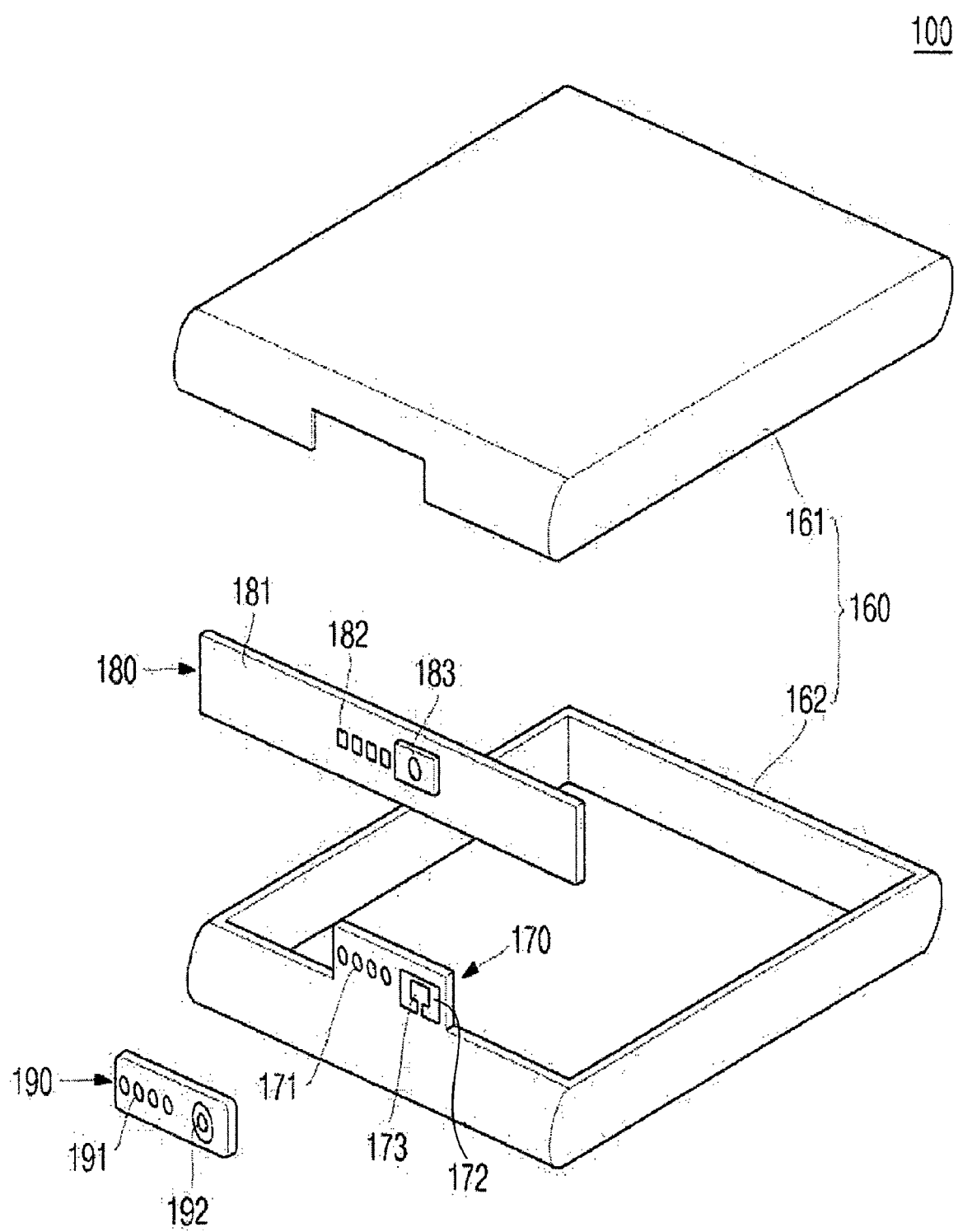
FIG. 1 is a perspective view illustrating a battery case according to an exemplary embodiment of the principle of the present invention.

FIG. 1 is a perspective view illustrating a battery case constructed as an exemplary embodiment of the principle of the present invention.

Referring to FIG. 1, the battery case 100 according to the present invention includes a case 160, a circuit 180 and a cover film 190.

Case 160 is composed of at least one sub-cases which include a first case 161 and a second case 162, and a space capable of receiving a bare cell of a secondary battery is formed between front case 161 and second case 162, the circuit Circuit 180 is received inside of case 160, and particularly, a residual capacity display unit 170 is formed along one side of case 160. Case 160 is made of plastic by injection molding or an equivalent technique. Residual capacity display unit 170 may be separately formed and then attached to case 160; however residual capacity display unit 170 may be integrally formed with case 160 when case 160 is formed. The present invention, however, is not restricted thereto. In case of forming residual capacity display unit 170 separately, there is an advantage that residual capacity display unit 170 may be made of a material different from case 160; however the process may be rather complicated. Further, the shape of case 100 illustrated in FIG. 1 is an example, the shape of the case and the number of the sub-case may be different, in accordance with the shape of the bare cell received inside the case, and the present invention is not limited by these drawings.

Residual capacity display unit 170 is formed on case 160, and it is composed of a display window 171 and a fulcrum 173. Residual capacity display unit 170 corresponds to circuit 180 at the inside space of case 160, and cover film 190 is attached to the external surface of residual capacity display unit 170. Display window 171 provides a path for emitting the light generated from light emitting diodes 182 mounted on circuit 180 to the outside of case 160, and display window 171 is provided as a hole formed to correspond to light emitting diodes 182. Even if display window 171 is illustrated as the four (4) holes shown in FIG. 1; however it is possible to form the display window as a single wide hole, and the present invention is not restricted thereto. The number of holes in display window 171 may be equal to the number of light emitting diodes 182 in circuit 180. Fulcrum 173 supports a button cap 192 of cover film 190, and fulcrum 173 transmits the movement of button cap 192 to push switch 183 in circuit 180. To do that, fulcrum 173 is formed at a position corresponding to the position of push switch 183. Fulcrum 173 extends from case 160 and is formed in button hole 172.

A residual capacity calculating circuit for calculating the residual capacity of the bare cells received into the inside of case 160 is formed in circuit 180, and circuit 180 displays a visual representation of residual capacity of the power through light emitting diodes 182 in response to the movement of push switch 183. To do that, at least one light emitting diode 182 and push switch 183 are mounted in circuit 180. Further, when a light emitting diode 182, it is possible to use a multicolor light emitting diode 182 that changes its color according to the charging residual amount of change aggregately held by the batteries resident within case 160. Light emitting diode 182 is described as a light emitting device for displaying an indication of the charging residual capacity; however the present invention is not restricted thereto. It is possible to replace the light emitting diode 182 with a seven segment light emitting device that is capable of displaying numerals and a level display unit. In case of using other elements that provide a visual representation that varies correspondence to the charge remaining upon the batteries resident within case 160, it is possible to use such other light emitting elements with ease by constructing case 160 and cover film 190 in a form that correspond to the display devices. A charging/discharging circuit for controlling the charge/discharge of the bare cells, and a protection circuit for protecting the bare cells and the external devices from overcharge, over-discharges, and short circuit may be further formed in the circuit 180. The present invention, however, is not restricted thereto.

Cover film 190 is attached to the external surface of residual capacity display unit 170. Particularly, cover film 190 includes button cap 192 formed at a position corresponding to the position of fulcrum 173 of residual capacity display unit 170, and a display pattern 191 formed at a position corresponding to the position of display window 171. Cover film 190 may be made of vinyl, epoxy, polyethylene terephthalate, and the equivalent or the mixture, and cover film 190 may be made of a rather tough synthetic resin. The present invention, however, is not restricted thereto. Cover film 190 may be adhered to the external surface of residual capacity display unit 170 by a bonding agent and an adhesive tape, or by partly melting cover film 190 through the heat which cover film 190 can resist. The present invention, however, is not restricted thereto. The pattern, color, and transparency of display pattern 191 are different from those of the other parts of cover film 190 so that the user can discern the light from light emitting diodes 182. And, button cap 192 is arranged on fulcrum 173 and transmits the push pressure to fulcrum 173 of residual capacity display unit 170. Therefore, button cap 192 may be made of a tough synthetic resin having elasticity, or it may be formed by connecting a separate plastic structure to cover film 190. The present invention, however, is not restricted thereto.

Figure 2:
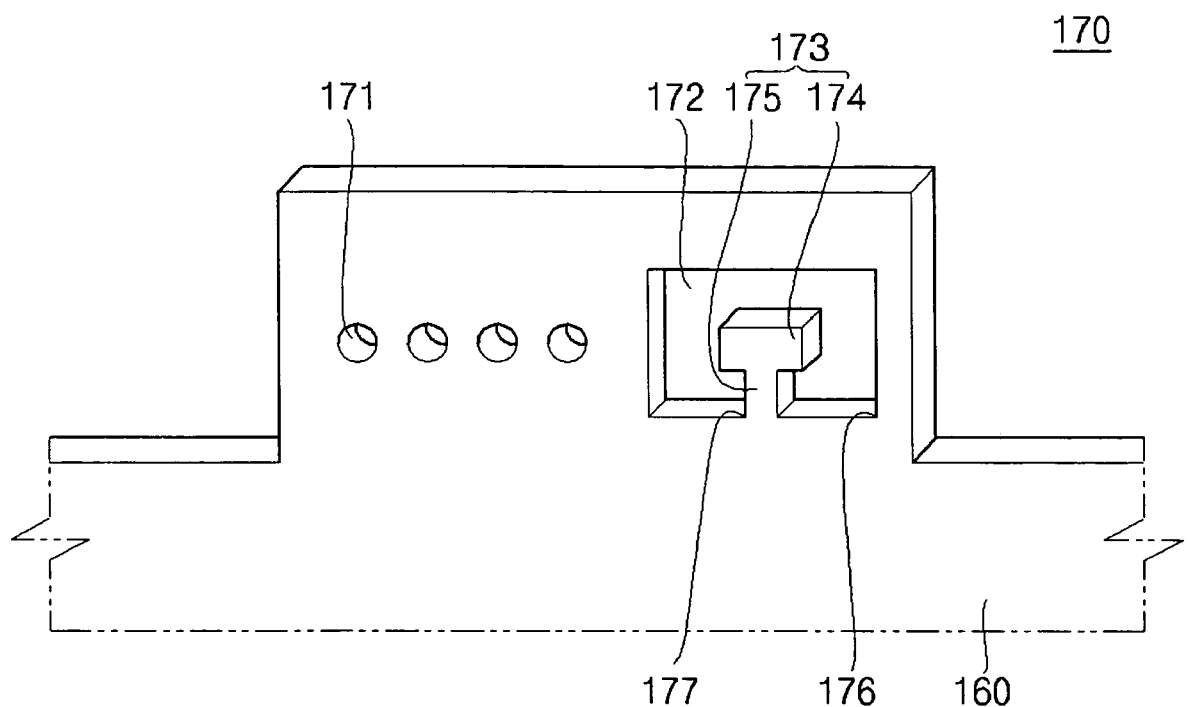
FIG. 2 is a detailed view illustrating of a residual capacity display unit in FIG. 1.

FIG. 2 is a detailed view illustrating of a residual capacity display unit in FIG. 1.

Residual capacity display unit 170 described in FIGS. 1 and 2 is extended from the edge of second case 162 in the direction of connection with first case 161; however it may be formed at any position in the case 160. Residual capacity display unit 170 is composed of a display window 171 and a fulcrum 173, as described above. The detailed explanation of display window 171 will be omitted since it is already described above.

Fulcrum 173 is extended from case 160 to button hole 172. Even though fulcrum 173 is composed of head 174 of a wide width, and leg 175 which connects head 174 with case 160 in FIGS. 1 and 2; however it is possible to abbreviate head 174 and the present invention is not restricted thereto. In the explanation of the present invention, fulcrum 173 having head 174 will be mainly described.

Head 174 is formed to have the width wider than the width of leg 175. This is to obtain the contact area for contacting with push switch 183, and head 174 may be formed to have square shape as described in FIG. 2, round shape, triangular shape or polygonal shape.

Leg 175 is extended from case 160 and connects head 174 with case 160. Leg 175 supports head 174 so that head 174 is able to move toward push switch 183 as the pressure which is applied, and return to the initial position when the pressure is released. Leg 175 is extended from the center part of button hole 172 in FIG. 2; however it may be extended from edge 176 and the present invention is not restricted thereto.

In case that the user applies force on button cap 192 of cover film 190 to check the residual capacity, head 174 below button cap 192 moves to the direction of push switch 183. And, in case that the user release the force after push switch 183 is pressed by head 174, head 174 is returned to the initial position by leg 175. Consequently, circuit 180 displays the residual capacity through turn on/off of light emitting diodes 182 in response to the signal from push switch 183.

The force applied to fulcrum 173 by the user concentrates on leg 175 of fulcrum 173. Particularly, the highest load is applied to connecting part 177 in which leg 175 and case 160 contact to each other. Therefore, leg 175 may break. And, fulcrum 173 may be made of the same material as material of case 160 for the convenience of process, as described above. Generally, case 160, however, is made of a plastic resin having good mechanical strength rather than the elasticity in order to protect circuit 180 and the bare cells which are receiving in case 160. Therefore, connecting part 177 may break if fulcrum 173 is made of the same material as material of case 160 or integrally formed with case 160. And, push switch 183 may be damaged due to the low elasticity of fulcrum 173 when the user applies more than enough force. Therefore, other exemplary embodiments, which have improved the disadvantages of the above-described embodiments, are described. One of the improved embodiments is illustrated in FIG. 3.

FIG. 3 is an exemplary view illustrating a fulcrum constructed as another exemplary embodiment of the principle of the present invention.

Referring to FIG. 3, fulcrum 273 of residual capacity display unit 270 according to another exemplary embodiment of the principle of the present invention is bent at least one time in the direction parallel to button cap 192 of residual capacity display unit 270.

Fulcrum 273 described in FIG. 3 is bent once in the direction parallel to the surface of button cap 192 covering the surface of fulcrum 273. The present invention, however, is not restricted thereto. To do that, fulcrum 273 in FIG. 3, contrary to the above-described embodiment, has connecting part 277 biased one side of button-hole 172. Connecting part 277 may be formed at edge 176 of button-hole 172. In case that leg 275 is bent at least one time as fulcrum 273 described in FIG. 3, the load of connecting part 277 is reduced as the load is distributing to bend part 279 when the pressure is applied to fulcrum 273. Therefore, the breakage of fulcrum 273 is considerably diminished.

The direction of the pressure in FIG. 3 is perpendicular to the surface of head 274. Head 274 moves into the direction of push switch 192 when the pressure is applied to fulcrum 273, and thus leg 275 between bend part 279 and head 274 tilts. And, leg 275 between bend part 279 and connecting part 277 twists and distributes the load. Further, if more pressure is applied, the load is applied to connecting part 277 as bend part 279 moves into the direction of the push switch 192. The load, however, is distributed through bend part 279, and thus the load applied to connecting part 277 is considerably diminished in comparison with the above-described embodiment. Particularly, the length of leg 275 increases in comparison with the above-described embodiment by bending leg 275. Therefore, even if fulcrum 273 is made of low elasticity material, the deflection of fulcrum 273 is easily achieved in comparison with the above-described embodiment, because of the increased length. Therefore, the user also does not have to apply excessive force, and thus the pressure applied to fulcrum 273 as well as push switch 183 is diminished. This may prevent fulcrum 273 and push switch 183 from being damaged.

It is preferable that bending angle (A1) of leg 275 is substantially 90 to 180 degrees. If the bending angle is below 90 degrees, the distribution force is weak, and if the bending angle is 180 degrees, legs 275 is same with legs 275 of FIG. 1, so the effects are not expected. Therefore, it is preferable that bending angle of leg 275 is between 90 and 180 degrees; however the present invention is not restricted thereto.

Figure 4A:
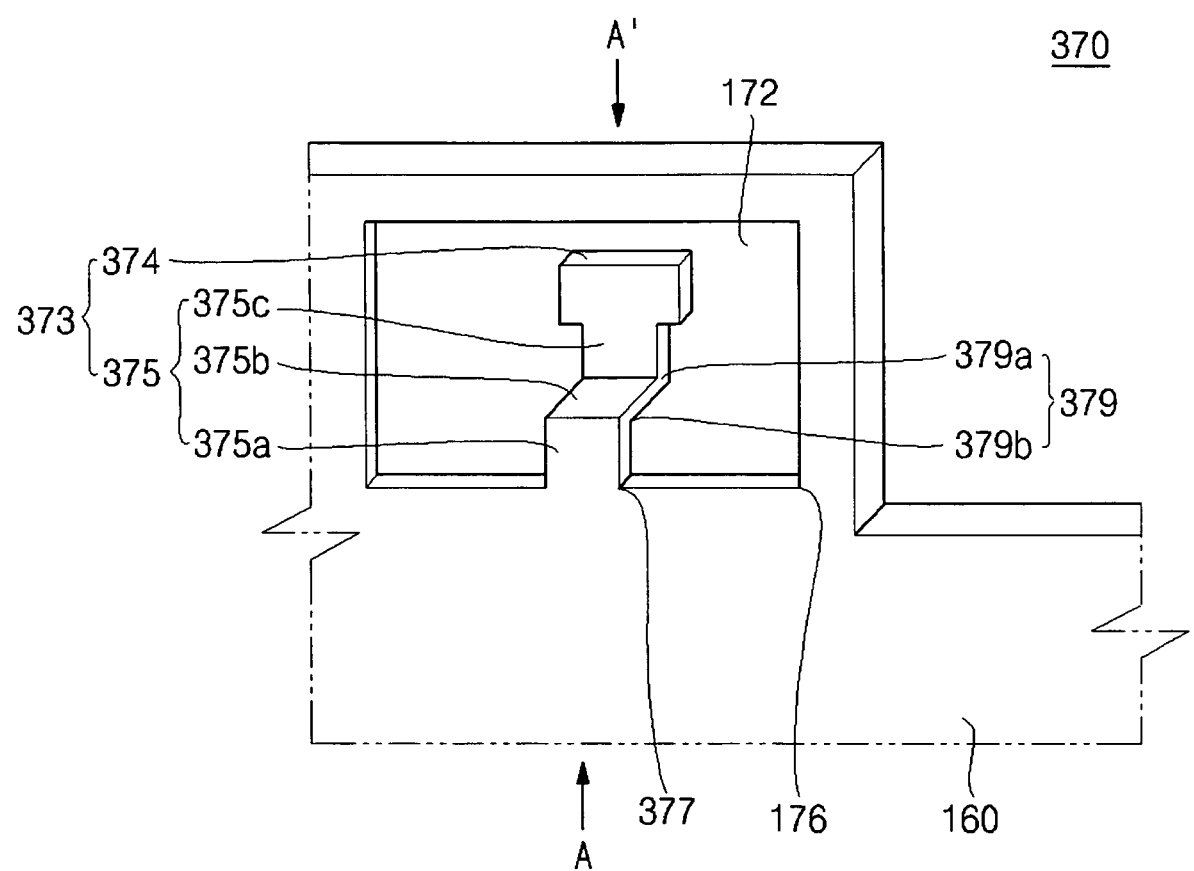
FIG. 4a is an exemplary view illustrating a fulcrum constructed as still another exemplary embodiment of the principle of the present invention.
Figure 4B:
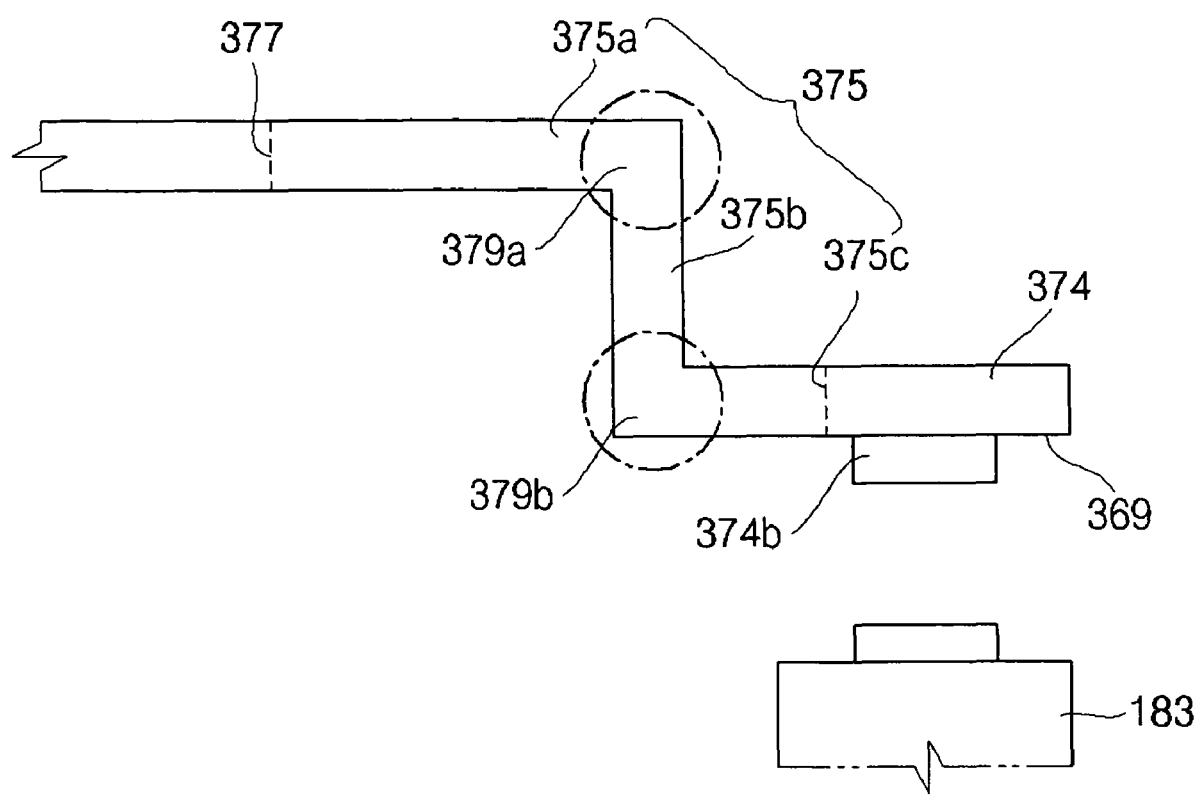
FIG. 4b is a cross-sectional view of FIG. 4a taken along the line A-A'.

FIGS. 4a and 4b are exemplary view illustrating a fulcrum according to still another exemplary embodiment according to an exemplary embodiment of the principle of the present invention, FIG. 4a is a perspective view and FIG. 4b is a cross-sectional view of FIG. 4a taken along the line A-A'.

Referring to FIGS. 4a and 4b, fulcrum 373 according to another embodiment of the principle of the present invention is formed to have at least 2 steps as it is bent at least two times in the direction perpendicular to button cap 192. Namely, fulcrum 373 can have at least two bend parts (379a, 379b). Therefore, fulcrum 373 according to another embodiment of the principle of the present invention is composed of head 374 and first to third legs 375 (375a, 375b, 375c). First leg 375a is extended from case 160 to the direction parallel to the surface of button cap 192. And, second leg 375b is bent and extended from first leg 375a in the direction of push switch 183, third leg 375c is bent and extended from second leg 375b to the direction parallel to first leg 375a. Further, head 374 is formed at the end of third leg 375c.

Head 374 of fulcrum 373 is more adjacent to push switch 183 in comparison with the above-described embodiments, as first leg 375a is extended from connecting part 377, second leg 375b is bent from first leg 375a and extended in the direction of push switch 183, and third leg 375c is bent to the direction parallel to first leg 375a, and particularly, the bending direction is the direction of push switch 183. Protrusion 374b for contacting with push switch 183 may be further formed on lower surface 369 of head 374.

According to the embodiment described in FIG. 4, the effects similar to those of the embodiment in FIG. 3 are expected. That is, the deflection of fulcrum 373 is more easily achieved as the length of fulcrum 373 is increasing, even if fulcrum 373 is made of low elasticity material. Furthermore, first leg 375a, second leg 375b and third leg 375c distribute the pressure, and thus the deflection is more easily achieved. This may reduce the pressure against connecting part 377, and minimize the pressure against respective bend part 375.

Figure 5:
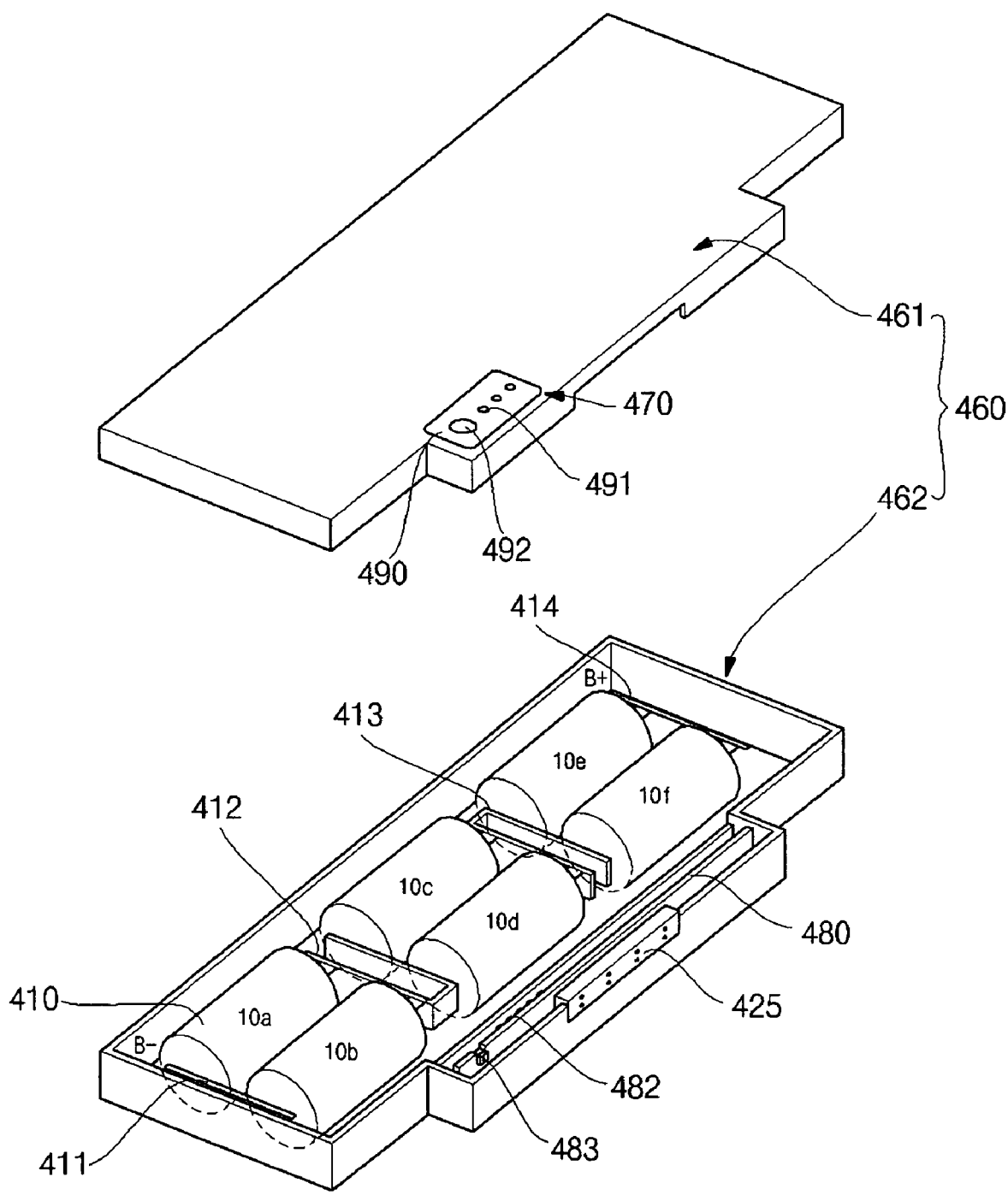
FIG. 5 is a perspective view illustrating a secondary battery according to an exemplary embodiment of the principle of the present invention.

FIG. 5 is a perspective view illustrating a secondary battery according to an exemplary embodiment of the principle of the present invention.

Referring to FIG. 5, secondary battery 401 according to the present invention includes bare cell 410, case 460, residual capacity display unit 470, circuit 480, and cover film 490. And, secondary battery 401 according to the present invention may further include a multitude of conductive plates 411, 412, 413, and 414. Here, secondary battery 401 is composed of cylindrical bare cells in FIG. 5; however it is possible to use square type bare cells to form secondary battery 401, and the present invention is not restricted thereto.

Bare cell 410 is configured that an upper surface and a lower surface have polarity different to each other. In FIG. 5, it is supposed that a positive electrode is in the direction of a highest electric potential end (B+), and a negative electrode is in the direction of a lowest electric potential end (B−). It is possible to use the secondary battery as this bare cell 410; however, the present invention is not restricted thereto. And, only 6 bare cells 410 are described in FIG. 5; however the present invention is not restricted to the drawings. Further, 3 series steps structure, in which 2 parallel bare cells consist of one step, is described; however it is possible to change the connecting relations and arrangements and thus the present invention is not restricted thereto. Bare cell 410 is connected with circuit 480 via first conductive plate 411 and second conductive plate 414.

Conductive plate 411 to 414 is classified into first to fourth conductive plates 411, 412, 413, 414. Among them, first and fourth conductive plates 411, 414 electrically connect the highest electric potential end (B+) and the lowest electric potential end (B−) of bare cell 410 with circuit 480, respectively. And, second and third conductive plates 412, 413 are arranged so that bare cells 10a & 10b, 10c & 10d, 10e & 10f consisting of the same step are parallel connected to each other and serially connected with the next step. These conductive plates 411 to 414 may be made of Cu, Ni, Al, and the equivalent metals or the alloy; however the present invention is not restricted thereto. And, first to fourth plates 411 to 414 are necessary as bare cell 410 configured of three steps in FIG. 5; however it is possible to increase/decrease the number of the conductive plate in accordance with the number and the arrangement of the bare cell 410, but the present invention is not restricted thereto.

The space for receiving bare cell 410 and circuit 480 is formed in case 460 as described above. Particularly, connector 425 for connecting secondary battery 401 and external device is attached or formed on case 460, and residual capacity display unit 470 is formed on one side. Particularly, cover film 490 is attached to residual capacity display unit 470 as described in FIG. 5. Case 460, cover film 490, and residual capacity display unit 470 are explained in the above-described embodiments, a detailed explanation in relation to FIG. 5 will be abbreviated.

Circuit 480 is received in case 460. In FIG. 5, it is supposed that the charging/discharging circuit and the residual capacity calculating unit are integrally formed in circuit 480. Therefore, circuit 480 is electrically connected with the highest electric potential end (B+) and the lowest electric potential end (B−) of bare cell 410 through first and fourth conductive plates 411, 414. Also, circuit 480 is electrically connected with connector 425. Push switch 483 and multitude of light emitting diodes 482 are attached to one side of the substrate of circuit 480.

Connector 425 is electrically connected with circuit 480, and it is formed as a socket capable connecting with the external device.

Secondary battery 401 according to the present invention is manufactured by assembling first case 461 and second case 462 after receiving bare cell 410, circuit 480, and conductive plates 411 to 414 in case 460. Here, other than connector 425 and cover film 490, they are received in the case when cases 460 are assembled, and thus they are not visible from the outside.

Secondary battery 401 of the present invention is charged through connector 425, and the charged secondary battery is used by connecting it with the external device via connector 425. Particularly, it is possible to check the residual capacity of secondary battery 401 as the light emitting through display pattern 491, in case of pressing button cap 492 of cover film 490 even if secondary battery 401 is not connected to the external device; manual depression of button cap 492 causes displacement of a fulcrum (not shown) positioned between button cap 492 and switch 483, thereby activating display pattern 491 to visually indicate a representation of the residual aggregate charge available from bare cells 10a-10f of secondary battery 401 stored within case 460 of secondary battery 401.

Further, secondary battery 401 according to the present invention may reduce the processing costs for separately forming residual capacity display unit 470, because the fulcrum configured by the above-described embodiments is integrally formed with the case. And, it is possible to realize the residual capacity display unit, which is less damaged, even without attaching a separate reinforcing part to the fulcrum.

As described above, for a battery case according to the present invention and a secondary battery having the battery case, it is possible to check the residual capacity of the battery pack even if the electronics are turned off or the battery pack is detached from the electronics, by providing a residual capacity display unit.

For a battery case according to the present invention and a secondary battery having the battery case, it is possible for the user to check the residual capacity of the battery by providing a push button for checking the residual capacity to the case of the secondary battery.

And, it is possible to prevent the breakage of the push button mount due to the pressure from the user against the push button, by providing the push button which distributes pressure. More specifically, the present invention provides a fulcrum directly formed on the case to receive the force applied by the user and to deflect in order to distribute the pressure along the fulcrum.

The explained hitherto is to be considered in all respects as illustrative and not restrictive as to explain the technical spirit of the present invention, the present invention is not restricted to illustrative embodiments, it should be understood that the invention is not limited thereto. Those having ordinary skill in the art will recognize additional modifications, applications, and embodiments without departing the scope of the present invention.

What is claimed is:

1. A secondary battery, comprising:
   a bare cell;
   a circuit which is electrically connected with the bare cell, and calculates a residual capacity of the bare cell, and comprises a push switch and a light emitting device;
   a case which receives the bare cell and the circuit, and comprised a residual capacity display unit having a fulcrum and a display window respectively at positions corresponding to a push switch and the light emitting device; and
   a cover film attached to an external surface of the residual capacity display unit.

2. The secondary battery as claimed in claim 1, comprised of the display window being made of a through-hole to emit light from the light emitting device to outside of the case.

3. The secondary battery as claimed in claim 1, comprised of a button hole being formed in the residual capacity display unit at a position corresponding to the fulcrum.

4. The secondary battery as claimed in claim 3, comprised of the fulcrum being formed as a portion of the case and being extended from the case to the button hole.

5. The secondary battery as claimed in claim 4, comprised of the fulcrum being composed of a leg which is extended from the case, and a head which is united with the leg at the end of the leg to have the width wider than that of the leg.

6. The secondary battery as claimed in claim 5, comprised of the fulcrum being formed as the leg and being bent to be parallel to the external surface of the case on which the residual capacity display unit is formed.

7. The secondary battery as claimed in claim 5, comprised of the fulcrum being formed as the leg and being bent to be perpendicular to the surface of the case on which the residual capacity display unit is formed.

8. The secondary battery as claimed in claim 5, comprised of a protrusion being formed on one surface of the head.

9. The secondary battery as claimed in claim 1, comprised of the light emitting device being a light emitting diode.

10. The secondary battery as claimed in claim 1, comprised of the cover film comprising a display pattern which corresponds to the display window and projects the light from the light emitting device, and a button cap which is formed at a position corresponding to the fulcrum and contacts with the fulcrum by the external pressure.

11. The secondary battery as claimed in claim 1, comprised of a connector electrically connected with the circuit, and formed as a socket, and connected with the external device.

12. The secondary battery as claimed in claim 1, comprised of a plurality of conductive plates arranged, with first and end conductive plates of the plurality of conductive plates respectively connecting a highest electric potential end (B+) and a lowest electric potential end (B−) of the bare cell with the circuit, and the others separately connecting to the bare cells.

13. A secondary battery, comprising:
a case providing a receptacle accommodating a bare cell;
a circuit borne by the case, comprised of a switch and a light emitting device, the circuit being operably connectable to the bare cell to provide an electrical indication of the residual charge of the bare cell, and to respond to an activation of the switch by driving the light emitting device to provide a visual representation corresponding to the electrical indication;
a cover film attached to an external surface of a residual capacity display unit; and
the residual capacity display unit mounted on the case between the circuit and the cover film, the residual capacity display unit comprising a display window and a fulcrum disposed between the cover film and the switch, the fulcrum being physically displaced by manual manipulation of the cover film to activate the switch while the display window enables viewing of visual representations.

14. The secondary battery as claimed in claim 13, comprised of the display window being made of a through-hole accommodating passage of light from the light emitting device to outside of the case.

15. The secondary battery as claimed in claim 13, comprised of a button hole being formed in the residual capacity display unit in a position in operable alignment with the fulcrum and the switch.

16. The secondary battery as claimed in claim 13, comprised of the fulcrum being simultaneously formed together with case, and extends from the case to a button hole.

* * * * *